(12) United States Patent
Woodward

(10) Patent No.: US 10,579,722 B1
(45) Date of Patent: Mar. 3, 2020

(54) STRUCTURED METADATA FOR DYNAMIC DATA ENCAPSULATION

(71) Applicant: Sprint Communications Company L.P., Overland Park, KS (US)

(72) Inventor: Suzzanne L. Woodward, Lee's Summit, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 23 days.

(21) Appl. No.: 16/045,721

(22) Filed: Jul. 25, 2018

(51) Int. Cl.
*G06F 17/00* (2019.01)
*G06F 17/24* (2006.01)
*G06F 12/0802* (2016.01)
*G06F 17/21* (2006.01)
*G06F 16/25* (2019.01)
*G06F 16/23* (2019.01)

(52) U.S. Cl.
CPC ........ *G06F 17/243* (2013.01); *G06F 12/0802* (2013.01); *G06F 16/2379* (2019.01); *G06F 16/252* (2019.01); *G06F 17/211* (2013.01); *G06F 17/245* (2013.01); *G06F 17/246* (2013.01); *G06F 2212/1041* (2013.01)

(58) Field of Classification Search
CPC .... G06F 17/243; G06F 17/246; G06F 17/247; G06F 17/211; G06F 16/2379; G06F 16/252; G06F 12/0802; G06F 2212/1041
See application file for complete search history.

(56) References Cited

U.S. PATENT DOCUMENTS

| | | | | |
|---|---|---|---|---|
| 7,426,734 | B2 * | 9/2008 | Debique | G06F 8/20 718/104 |
| 8,301,720 | B1 * | 10/2012 | Thakker | G06F 9/546 709/217 |
| 2004/0183831 | A1 * | 9/2004 | Ritchy | G06F 16/958 715/762 |
| 2006/0117073 | A1 * | 6/2006 | Bosworth | G06F 16/273 |
| 2009/0094133 | A1 * | 4/2009 | Oates | G06F 17/243 705/26.1 |
| 2013/0019013 | A1 * | 1/2013 | Rice | H04L 61/1511 709/225 |
| 2014/0136483 | A1 * | 5/2014 | Chaudhary | G06F 16/316 707/639 |
| 2014/0181013 | A1 * | 6/2014 | Micucci | G06F 16/90 707/610 |

(Continued)

*Primary Examiner* — Laurie A Ries

(57) ABSTRACT

A computer system for providing access service request (ASR) forms. The system comprises a data store comprising structured metadata, where the structured metadata represents a plurality of ASR forms, a processor, a non-transitory memory, and an application stored in the non-transitory memory. When executed by the processor, the application traverses the structured metadata, builds a plurality of ASR form group containers based on the traversing, where each ASR form group container is associated with one access service request type and the ASR form group container comprises definitions of forms, sections, and attributes and methods for accessing the forms, sections, and attributes by a front-end workstation for presenting a ASR, and caches each of the ASR form group containers by the application in a memory of the computer system, wherein the ASR form group containers are built once during an execution cycle by the application on initiation of the application.

20 Claims, 6 Drawing Sheets

(56) References Cited

U.S. PATENT DOCUMENTS

| | | | |
|---|---|---|---|
| 2014/0230076 A1* | 8/2014 | Micucci | G06F 21/6209 726/28 |
| 2014/0244447 A1* | 8/2014 | Kim | G06Q 30/0254 705/27.2 |
| 2015/0143503 A1* | 5/2015 | Micucci | H04L 63/029 726/11 |

* cited by examiner

STRUCTURED METADATA FOR DYNAMIC DATA ENCAPSULATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The telecommunication industry has many different companies and stake holders that interoperate and share resources to maintain electronic communications networks. An extraordinary array of old and new electronic equipment are integrated into our telecommunications infrastructure. The alliance for telecommunications industry solutions (ATIS) is a standards organization that works to develop and promulgate standards that promote smooth interoperation among different telecommunication companies. ATIS provides guidance on cybersecurity, network reliability, technological interoperability, billing, and network functions virtualization.

SUMMARY

In an embodiment, a method of presenting access service request (ASR) forms is disclosed. The method comprises traversing structured metadata read from a data store by an access service ordering guidelines (ASOG) application executing on a computer system, where the structured metadata represents a plurality of ASR forms and building a plurality of ASR form group containers by the ASOG application based on the traversing, where each ASR form group container is associated with one access service request type and the ASR form group container comprises definitions of forms, sections, and attributes and methods for accessing the forms, sections, and attributes by a front-end workstation for presenting an ASR. The method further comprises caching each of the ASR form group containers by the ASOG application in a memory of the computer system, wherein the ASR form group containers are built once during an execution cycle by the ASOG application on initiation of the ASOG application.

In another embodiment, a computer system for providing access service request (ASR) forms is disclosed. The computer system comprises a data store comprising structured metadata, where the structured metadata represents a plurality of ASR forms, a processor, a non-transitory memory, and an access service ordering guidelines (ASOG) application stored in the non-transitory memory. When executed by the processor, the ASOG application traverses the structured metadata read from the data store. The ASOG application builds a plurality of ASR form group containers by the ASOG application based on the traversing, where each ASR form group container is associated with one access service request type and the ASR form group container comprises definitions of forms, sections, and attributes and methods for accessing the forms, sections, and attributes by a front-end workstation for presenting a ASR and caches each of the ASR form group containers by the ASOG application in a memory of the computer system, wherein the ASR form group containers are built once during an execution cycle by the ASOG application on initiation of the ASOG application.

In yet another embodiment, a method of presenting standardized forms is disclosed. The method comprises traversing structured metadata read from a data store by a form application executing on a computer system, where the structured metadata represents a plurality of standardized forms. The method further comprises building a plurality of form group containers by the form application based on the traversing, where each form group container is associated with one user interface presentation and the form group container comprises definitions of forms, sections, and attributes and methods for accessing the forms, sections, and attributes by a front-end workstation for presenting the user interface and caching each of the form group containers by the form application in a memory of the computer system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
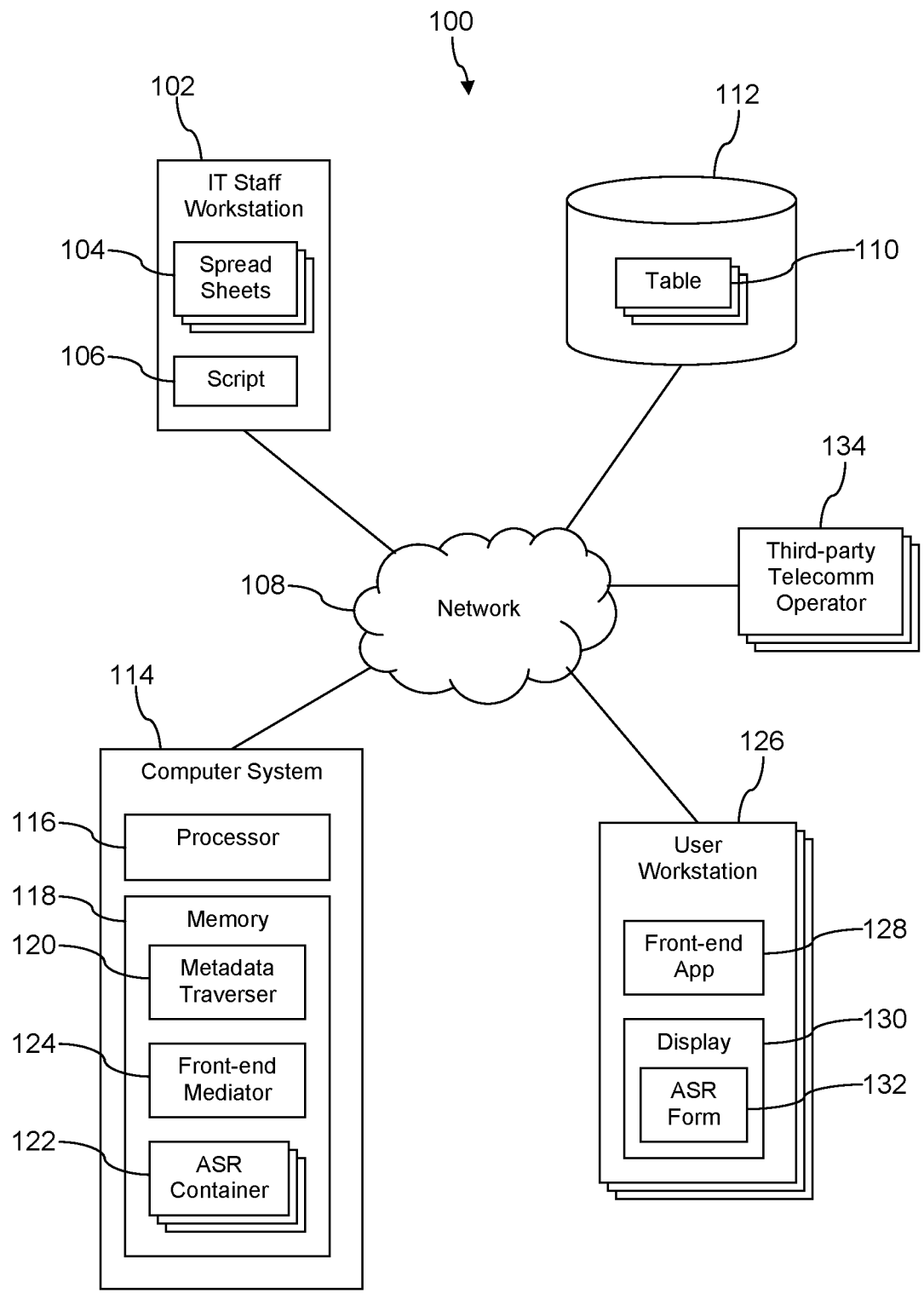
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The alliance for telecommunications industry solutions (ATIS) is a standards organization that provides guidance on formats for telecommunication companies ordering services from each other. More specifically, ATIS issues new guidelines that outline the forms, data elements, and the business rules to create access service requests (ASRs) for ordering telecommunication services and infrastructure and ASR notifications (also referred to as ASR responses). These guidelines are referred to as access service ordering guidelines (ASOGs) and may be revised as often as two times per year. ATIS issues revised guidelines, likewise, for local service ordering guidelines (LSOGs), as often as two times per year. These updated guidelines may percolate through many forms that are presented in workstation user interfaces for use by service provider crafts-persons to configure the communication network and provide communication service to customers.

Some traditional approaches code the form layouts, data elements, and business rules into applications accessed from front-end workstations or into the front-end applications themselves. In this case, ASOG and/or LSOG changes may drive many changes in the code, often duplicating changes where the data element or form is repeatedly presented in different user interface screens. These code changes may engage the time of highly skilled and expensive software engineers. These coding changes may entail time consuming and costly software testing to verify the software before placing the new code into production. The present disclosure teaches applying structured metadata to make changing ASR user interfaces more convenient, less costly, and more reliable. While some of the examples herein focus on ASR service requests, it is understood that the teachings may be advantageously applied for ASR notifications and for LSOG requests and notifications. The teachings may be applied for forms used in other industries such as the cable industry, the electric utility industry, the banking and finance industry, for example.

The structured metadata defines the artifacts that comprise an ASR—for example one or more forms, each form containing sections and/or attributes, where sections contain attributes. The structured metadata defines a taxonomy of data where some of the elements of the taxonomy provide data about data encapsulated in the system (e.g., the data stored in a data store or in a volume or block of the data store). The structured metadata further defines the order or presentation of these artifacts. The structured metadata defines how many characters an attribute may comprise, default values of attributes, and any business rules that may be associated with attributes. The specific layout of the ASR may be defined by the latest ASOG. An information technology (IT) worker may create this structured metadata in a variety of ways, but ultimately the structured metadata may be articulated or embodied in tables in a data store, where the tables are interrelated by primary keys and foreign keys. The structured metadata promotes systematically traversing the structured metadata to learn or discover how the ASRs are to be rendered and presented. For example, by searching the tables in a systematic order using foreign keys, a set of associated table entries can be collected and used to learn the layout of an ASR or user interface screen.

In an embodiment, an ASOG application is launched to execute on a computer system. As part of initiation, the ASOG application traverses the structured metadata and builds a plurality of software containers, each container capturing the artifacts and artifact manipulation methods associated with one ASR. Examples of ASRs include a transport service request, a cancel service request, and an end user special access order. Examples include one or more of confirmation, jeopardy, acceptance, and unacceptance. The ASOG application stores these containers in cache (e.g., in random access memory (RAM) in the computer system the ASOG application executes on). When a front-end application, such as a web browser executing on the work station of a telecommunication traffic engineer of a wireless communication service provider (or of a wireline communication service provider), requests the artifacts associated with one of the ASRs, the ASOG application reaches into the appropriate software container, makes a copy of its artifacts, and returns those artifacts to the front-end application. Alternatively, the ASOG application makes a copy of the appropriate software container and returns the container to the front-end application. The front-end application renders the ASR in a display of the work station of the traffic engineer in accordance with the information embedded in the artifacts of the container, for example with sections and attributes (e.g., fields) located on the display screen as indicated by the software container. When the traffic engineer enters information in the attributes, the front-end application captures them in storage and may send on the ASR to a third party for order fulfillment.

The system described above is highly flexible and easily accommodates frequent revisions of the ASOG provided by the ATIS. When the definition of a given attribute is changed from a 12 character field to a 20 character field, the change can be made one place in the structured metadata, even though the same attribute may appear in multiple different ASRs. When the ASOG application is turned off and powered back on, as part of its power-on initiation the new structured metadata is traversed, the ASR software containers are automatically rebuilt using the new definition of the attribute—and new definitions of other attributes, additions to sections and/or forms, the imposition of new business rules, and more—and the system has adopted the new ASOG. The software does not change, so extensive software testing is not needed (e.g., the ASOG application has not changed, the structured metadata that the ASOG application traverses has changed). Because the ASR software containers are cached, access to the containers is fast and avoids the computational expense of reaching out to read from mass storage such as disk drives or accessing data over the network. While the innovation has been described in the context of a telecommunications service provider and of the ATIS updating of ASOGs, this structured metadata for dynamic data encapsulation framework can be used in a wide variety of other applications where user interfaces are known to change frequently.

The system described above provides, in a more general view, a framework for creating dynamic web pages for use in creating forms using structured metadata that caches page layout. This cached content (e.g., form containers) is accessed at the time of page creation (e.g., rendering in a web browser or other front-end application), thereby allowing for a single point of change for the forms content. This framework isolates changes to the data store that contains the structured metadata, making maintenance of the software portion of the framework easier, more trouble-free, having a lesser burden on testing resources.

Turning now to FIG. 1, a system 100 is described. In an embodiment, system 100 comprises an information technology (IT) workstation 102 having a plurality of spread sheets 104 and a script 106. The script 106 may be executed by the IT workstation 102 to build structured metadata based on processing the spread sheets 104. The spread sheets 104 may be created by an IT technician using a spread sheet application (not shown) that executes on the IT workstation 102. The spread sheets may reflect or be created by the IT technician based on a document such as a requirements document or an access service ordering guidelines (ASOG) document. The requirements document or ASOG document may describe and/or illustrate a form or user interface for presenting in a web page and/or on a display screen.

The IT workstation 102 is communicatively coupled to a network 108 and via the network 108 communicatively coupled to a data store 112. Access to the data store 112 may be restricted to authorized users or applications. The script 106 may store the structured metadata that it generates in the data store 112 as metadata 110 in the form of tables. In another embodiment, the generation of structured metadata and the storing of the structured metadata 110 in the data store 112 may be accomplished in a different way. For example, a script or computer program may be used to generate the structured metadata and the storing of the structured metadata 110 in the data store 112 without reading from spreadsheets 104, for example by reading from a flat file or from a different container of text or data. The network 108 comprises one or more public networks, one or more private networks, or a combination thereof.

The system further comprises a computer system 114 communicatively coupled to the network 108 and one or more user workstations 126 communicatively coupled to the network 108. The computer system 114 comprises a processor 116 and a memory 118. A portion of the memory 118 may be non-transitory memory. Another portion of the memory 118 may be transitory memory. A metadata traverser 120 is stored in a non-transitory portion of the memory 118 and may be executed by the processor 116. The metadata traverser 120 is authorized to access the structured metadata 110 in the data store 112. The user workstations 126, by contrast, may not be authorized to access the structured metadata 110 or the data store 112.

The metadata traverser 120 may access the structured metadata 110 in the data store 112 and process it to build access service request (ASR) form containers 122 or form containers. A front-end mediator 124, stored in the non-transitory portion of the memory 118 and executed by the processor 116, may receive requests from a front-end application 128 executing on the user workstation 126 for a specific ASR form container or other form container. The front-end mediator 124 may access the form containers 122, make a copy of the requested form container 122, and transmit the copy of the form container to the front-end application 128. In an embodiment, the metadata traverser 120 and the front-end mediator 124 may be components of a single application, for example an ASOG application or a forms application.

The metadata traverser 120 may execute as part of an initialization portion of the ASOG application. When changes in the requirements or ASOG document have resulted in changes in the structured metadata 110 in the data store 112, the system 100 can adopt these changes simply by "bouncing" the ASOG application and/or the metadata traverser 120 (e.g., terminating the ASOG application and/or metadata traverser 120 and then launching the ASOG application and/or metadata traverser 120 again). In the process, the metadata traverser 120 executes and builds the ASR form containers 122 using the structured metadata 110 containing the changes.

The front-end application 128 may render the artifacts contained in the form container it receives as an ASR form 132 or other form in a display 130 of the user workstation 126. A user may view the form 132, enter data into the form, save the form, format the data entered into the form, and transmit that formatted data to a third-party telecommunication operator 134 or other organization, for example transmitting the formatted data to a computer system of the third-party telecommunication operator 134 or other organization. The third-party telecommunication operator 134 may process the formatted data to fulfill an order such as provisioning a transport resource, canceling a transport resource, or other activity. The third-party telecommunication operator 134 may further format an ASR notification or ASR response and return that to the front-end application 128.

It is understood that a plurality of front-end applications 128 executing on a plurality of different user workstations 126 may be interacting with the front-end mediator 124 at substantially the same time (e.g., in an interleaved manner or interacting concurrently with multiple instances of the front-end mediator 124). In this way, the system 100 may promote presenting the ASR form 132 and transmitting the formatted data in accordance with evolving ASOG documents. The IT staff workstation 102, the computer system 114, the user workstation 126, and the third-party telecom operator 134 computer systems may be implemented as computer systems. Computer systems are described further hereinafter.

Figure 2:
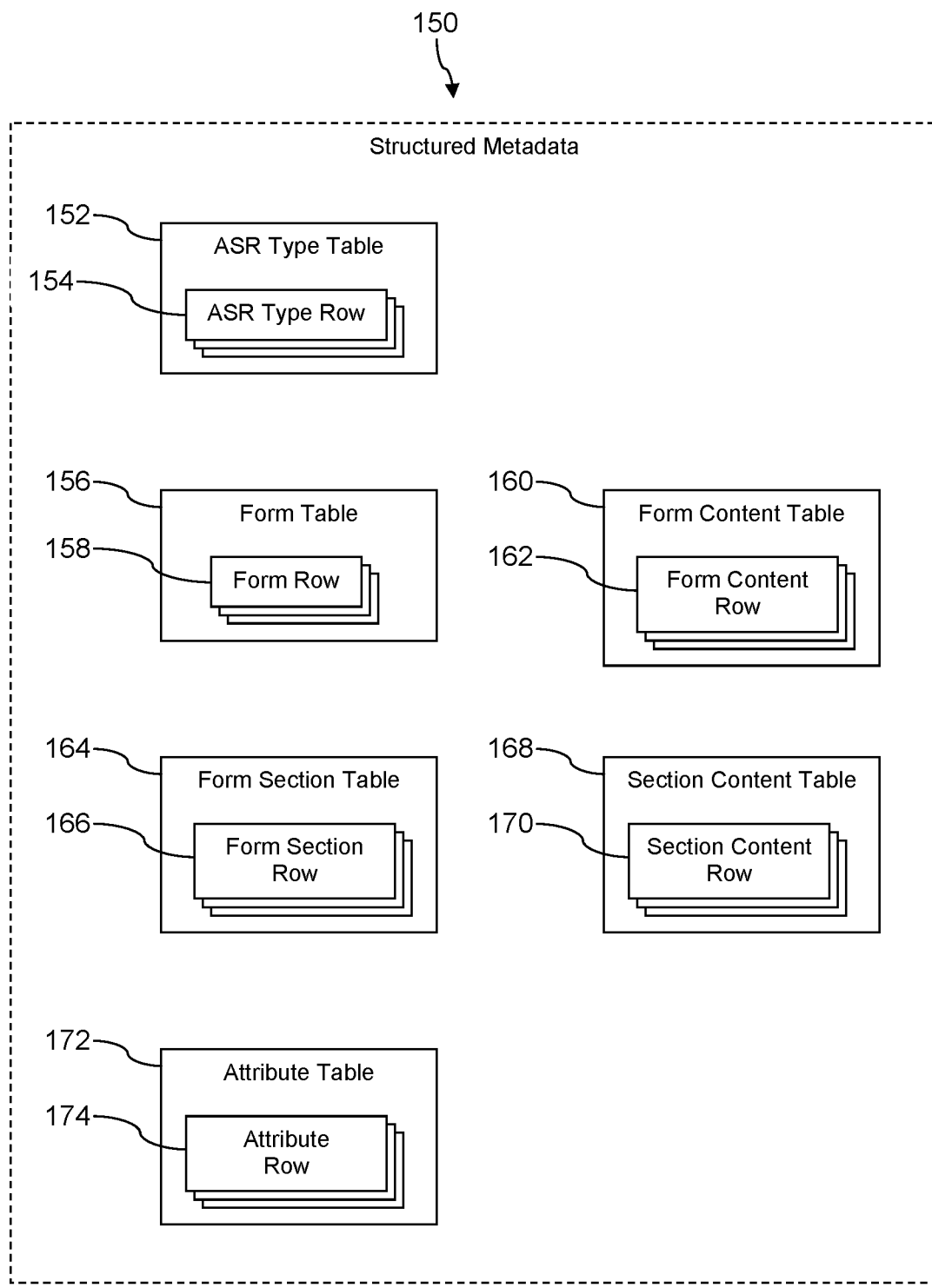
FIG. 2 is an illustration of structured metadata tables according to an embodiment of the disclosure.

Turning now to FIG. 2, an illustration of exemplary structured metadata 150 is described. The structured metadata 150 may be the form of structured metadata 110 illustrated in FIG. 1. The structured metadata 150 comprises a plurality of separate but related tables. Each table may contain a plurality of rows, each row arranged in the same structure of columns for the given table (i.e., different tables have different structures of columns). In an embodiment, the structured metadata 150 comprises an ASR type table 152 comprising a plurality of ASR type table rows 154, a form table 156 comprising a plurality of form table rows 158, a form content table 160 comprising a plurality of form content table rows 162. The structured metadata 150 further comprises a form section table 164 comprising a plurality of form section table rows 166, a section content table 168 comprising a plurality section content table rows 170, and an attribute table 172 comprising a plurality of attribute table rows 174. It is understood that in a different embodiment, the structured metadata 150 may have a different set of tables.

Figure 3:
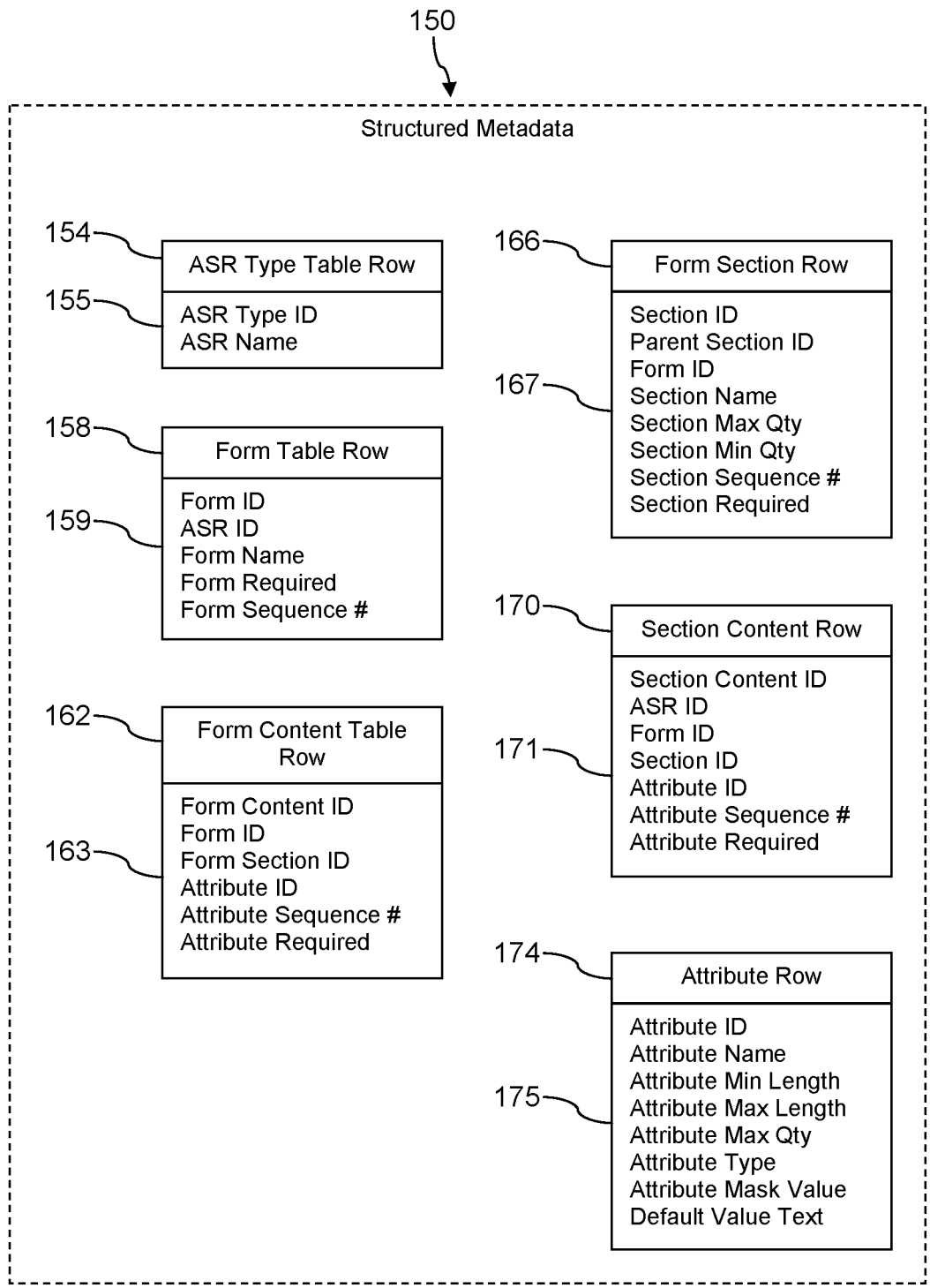
FIG. 3 is an illustration of structured metadata row composition according to an embodiment of the disclosure.

Turning now to FIG. 3, an illustration of exemplary row structures or schemas for the tables of the structured metadata 150 is described. It is understood that in different embodiments the row structures or schemas may be different in various ways without deviating from the spirit and teachings of the present disclosure. For example, some of the row structures may comprise a secured column that controls access to data in the row based on user privileges. An ASR type row structure 155 comprises an ASR type ID column and an ASR name column. The ASR type ID column is the primary key of the ASR type table row 154. A form table row structure 159 comprises a form ID column, an ASR ID column, a form name column, a form required column, and a form sequence number column. The form ID column is the primary key of the form table row 158. The ASR type ID column is a foreign key of the form table row 158 and refers to an ASR type table row 154 in the ASR type table 152. The form required column indicates whether the related form is or is not required and is interpreted by the front-end application 128 executing on the user workstation 126. The form sequence number column indicates a location of the related form in the ASR form 132 and is interpreted by the front-end application 128. It is noted that a single ASR form may be composed of one or more forms, such that a plurality of form table rows may be associated with the same ASR form (e.g., several different rows in the form table 156 include the same value in the ASR type ID column).

A form content table row structure 163 comprises a form content ID column, a form ID column, a form section ID column, an attribute ID column, an attribute sequence number column, and an attribute required column. The form content ID column is the primary key of the form content table row 162. The form ID column, the form section ID column, and the attribute ID column are foreign keys referring to a form table row 158 in the form table 156, a form section table row 166 in the form section table 164, and an attribute table row 174 in the attribute table 172 respectively. The form content table row 162 identifies some content that makes up the subject form, for example a form section or an attribute. A plurality of form content table rows 162 may be associated with the same form (e.g., the several rows include the same value in the form ID column), where the form comprises a plurality of attributes and/or sections. When a form content table row 162 identifies a form section, the attribute ID column, the attribute sequence number column, and the attribute required column may be assigned null values. When a form content table row 162 identifies an attribute, the form section ID may be assigned a null value.

A form section row structure 167 comprises a section ID column, a parent section ID column, a form ID column, a section name column, a section maximum quantity column, a section minimum quantity column, a section sequence number column, and a section required column. The section ID column is the primary key of the form section table row 166. The form ID column is a foreign key referring to a form table row 158 in the form table 156. The parent section ID column identifies a parent of the form section (if there is one, if there is not, this column has a null value). A section may encapsulate one or more attributes and one or more sections. Sections encapsulated in a section are deemed children sections of that section, and that section is deemed a parent section of those children sections. The section maximum quantity column and section minimum quantity column indicate maximum and minimum numbers of this section respectively. The section sequence number column indicates a location of the related section within the enclosing form and is interpreted by the front-end application 128. The section required column indicates whether the related section is or is not required and is interpreted by the front-end application 128.

A section content row structure 171 comprises a section content ID column, an ASR type ID column, a form ID column, a section ID column, an attribute ID column, an attribute sequence number column, and an attribute required column. The section content ID is the primary key of the section content row 170. The ASR type ID column, form ID column, section ID column, and attribute ID column are foreign keys referring to an ASR type table row 154 in the ASR type table 152, a form table row in the form table 156, a form section table row 166 in the form section table 164, and an attribute table row 174 in the attribute table 172 respectively. The attribute sequence number column indicates a location of the related attribute in the enclosing form section and is interpreted by the front-end application 128. The attribute required column indicates whether the related attribute is or is not required and is interpreted by the front-end application 128.

An attribute row structure 175 comprises an attribute ID column, an attribute name column, an attribute minimum length column, an attribute maximum length column, an attribute maximum quantity column, an attribute type column, an attribute mask value column, and a default value text column. The attribute ID column is the primary key of the attribute row 174. The attribute minimum length column and attribute maximum length column indicate minimum and maximum length of the attribute as rendered by the front-end application 128 in the ASR form 132. The attribute maximum quantity column indicates a maximum number of this attribute. The attribute type column indicates a type of the attribute. The attribute mask value column indicates a mask value, if any, for the attribute (a mask may be something that indicates a format for inputting information, for example hyphens in a phone number or diagonal slashes for representing a date in MM/DD/YYYY format). The default text value column indicates a default value, if any, for the attribute (e.g., today's date for a hotel reservation).

With reference again to FIG. 1, the metadata traverser 120 is able to discover the structure of a given ASR form by systematically navigating through the structured metadata 150. All ASR forms can be discovered by traversing the ASR type table 152, where each different ASR form is represented by a different row entry in the ASR type table 152. For a given ASR form, identify related form table rows 158 in the form table 156 (e.g., rows which have an ASR type ID column value that identifies the subject ASR form row 154). Each related row in the form table 156 identifies a form that is encapsulated in the subject ASR form. For each related row in the form table 156, identify related form content table rows 162 in the form content table 160 (e.g., rows which have a form ID column value that identifies the subject form table row 158). Each related form content table row 162 identifies either a section ID value that identifies a related form section table row 166 in the form section table 164 or an attribute ID value that identifies a related attribute table row 174 in the attribute table 172. For each related row in the form section table 164, identify related section content table rows 170 in the section content table 168.

Having identified all the forms, sections, section content, and attributes associated with the subject ASR form, the metadata traverser 120 can build an ASR container 122 associated with the subject ASR form containing all the information associated with the germane structured metadata 150. The information in this ASR container 122 describes the layout of the ASR: the forms and their positions in the ASR form; the sections and attributes and their positions within the forms; the attributes and their locations within the sections. The information about the attributes contained in forms and sections further indicates their length, the type of attribute they are, any mask value to display, and any default values. The metadata traverser 120 also builds access methods into the ASR container 122 that promotes the front-end application 128 interacting with the ASR container 122 when it receives a copy.

It will be appreciated that a common ASOG document change and a common form requirement change is to change the format of an attribute or to specify an attribute mask value. This kind of a change is readily inserted into the structured metadata 110, 150 by altering the value of the attribute maximum length column, the attribute minimum length column, or the attribute mask value of the appropriate attribute table row 174 in the attribute table 172. Once this change has been made, simply "bouncing" the metadata traverser 120 or the ASOG application causes the ASR containers 122 to be freshly built by the metadata traverser 120 from the structured metadata 110, 150, thereby automatically changing the subject attribute wherever it may occur in the ASR containers 122. For example, a single attribute may occur in a plurality of ASR forms, in a plurality of forms, and in a plurality of different sections. The one change in the definition of the subject attribute in the structured metadata 110, 150 followed by bouncing the metadata traverser 120 and/or the ASOG application changes all the subject attribute instances in the ASR containers 122. This innovation reduces errors and reduces testing substantially, in that the coding of the system 100 does not change, rather the input data (e.g., the structured metadata 110, 150) changes. The metadata traverser 120 has not changed and hence does not need to be retested.

Figure 4:
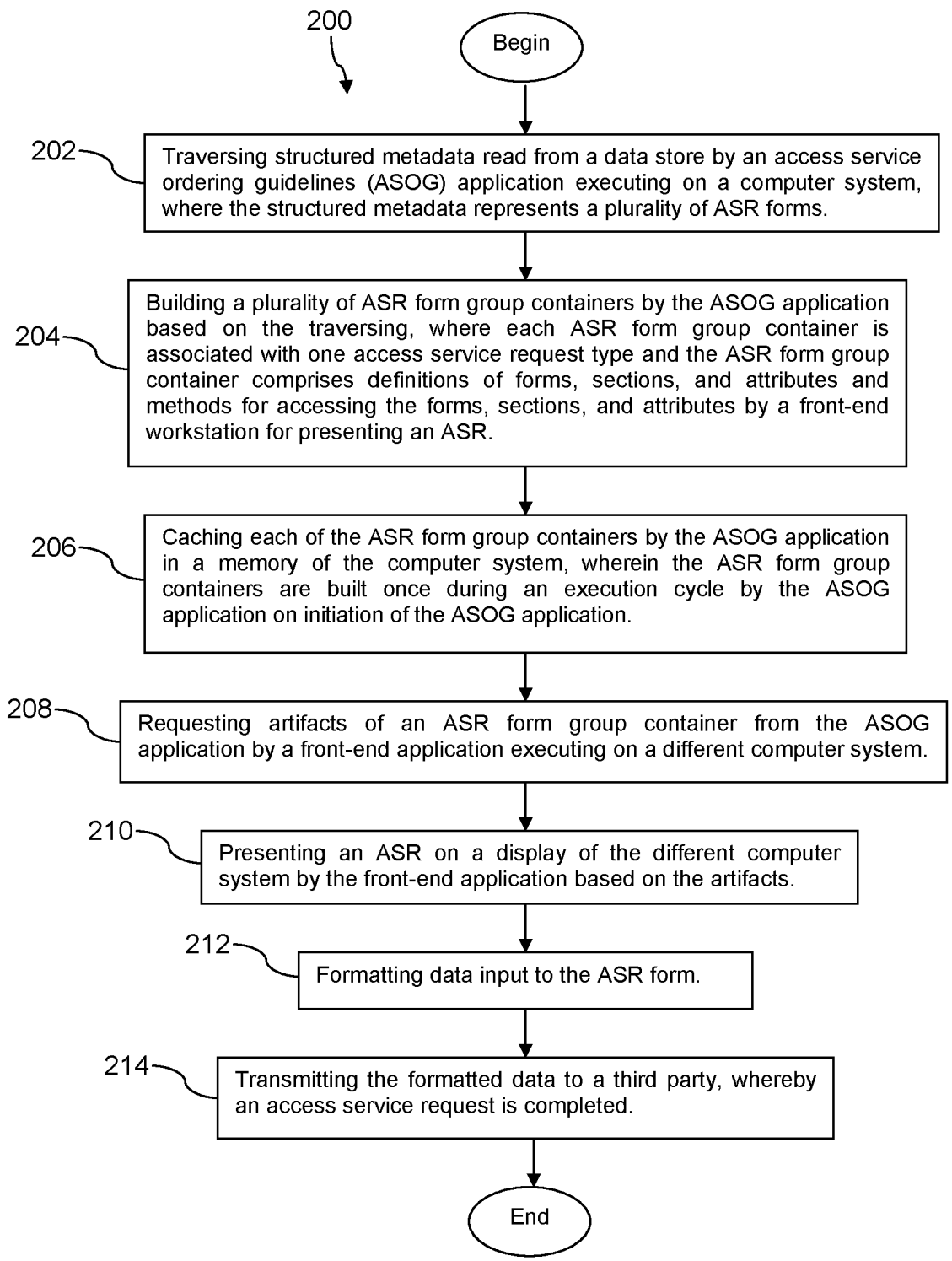
FIG. 4 is a flow chart of a method according to an embodiment of the disclosure.

Turning now to FIG. 4, a method 200 is described. In an embodiment, the method 200 may be performed by the system 100 described above with reference to FIG. 1, FIG. 2, and FIG. 3 to present access service request (ASR) forms. At block 202, the method 200 comprises traversing structured metadata read from a data store by an access service ordering guidelines (ASOG) application executing on a computer system, where the structured metadata represents a plurality of ASR forms. At block 204, the method 200 comprises building a plurality of ASR form group containers by the ASOG application based on the traversing, where each ASR form group container is associated with one access service request type and the ASR form group container comprises definitions of forms, sections, and attributes and methods for accessing the forms, sections, and attributes by a front-end workstation for presenting an ASR. At block 206, the method 200 comprises caching each of the ASR form group containers by the ASOG application in a memory of the computer system, wherein the ASR form group containers are built once during an execution cycle by the ASOG application on initiation of the ASOG application.

At block 208, the method 200 may comprise requesting artifacts of an ASR form group container from the ASOG application by a front-end application executing on a different computer system. At block 210, the method 200 may comprise presenting an ASR on a display of the different computer system by the front-end application based on the artifacts. At block 212, the method 200 may comprise formatting data input into the ASR form. At block 214, the method 200 may comprise transmitting the formatted data to a third party, whereby an access service request is completed. The formatted data may be said to represent the access service request.

Figure 5:
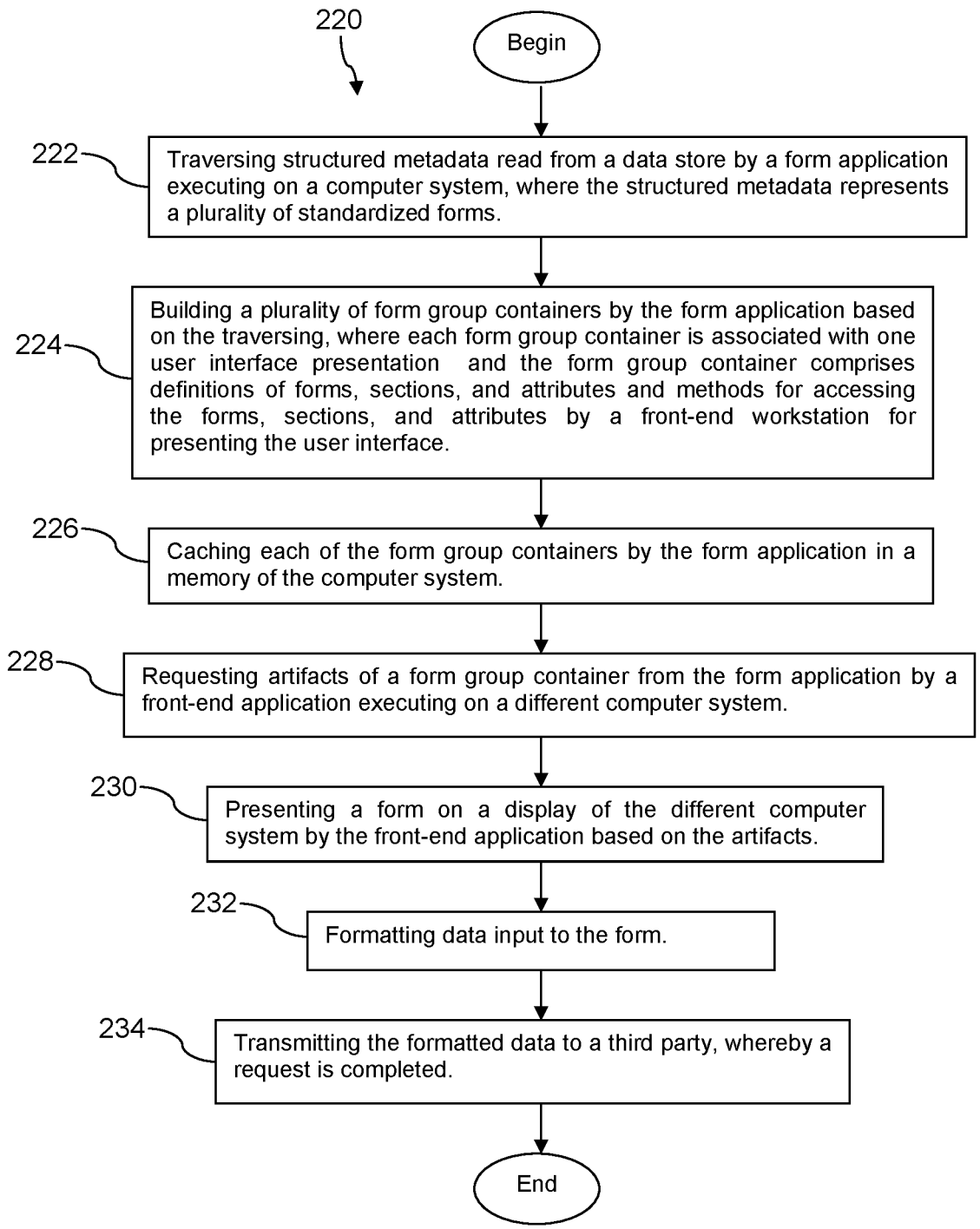
FIG. 5 is a flow chart of another method according to an embodiment of the disclosure.

Turning now to FIG. 5, a method 220 is described. The method 220 may be performed by the system 100 described above with reference to FIG. 1 to present standardized forms. At block 222, the method 220 comprises traversing structured metadata read from a data store by a form application executing on a computer system, where the structured metadata represents a plurality of standardized forms. At block 224, the method 220 comprises building a plurality of form group containers by the form application based on the traversing, where each form group container is associated with one user interface presentation and the form group container comprises definitions of forms, sections, and attributes and methods for accessing the forms, sections, and attributes by a front-end workstation for presenting the user interface. At block 226, the method 220 comprises caching each of the form group containers by the form application in a memory of the computer system.

At block 228, the method 220 may comprise requesting artifacts of a form group container from the form application by a front-end application executing on a different computer system. At block 230, the method 220 may comprise presenting a form on a display of the different computer system by the front-end application based on the artifacts. At block 232, the method 220 may comprise formatting data that has been input into the form. At block 234, the method 220 may comprise transmitting the formatted data to a third party, whereby a request is completed. The formatted data may be said to represent the form.

Figure 6:
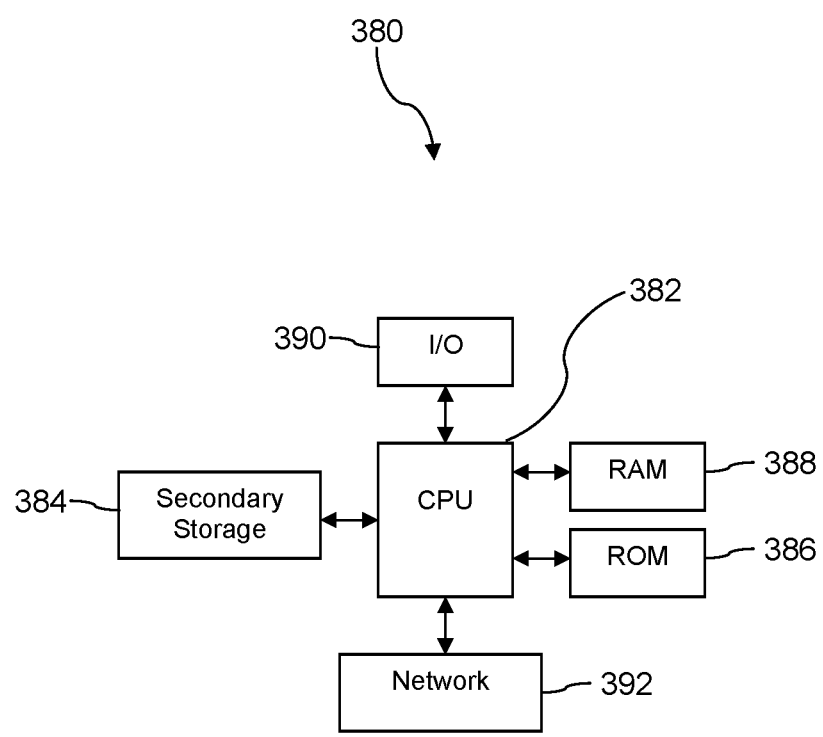
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of presenting access service request (ASR) forms, comprising:
traversing structured metadata read from a data store by an access service ordering guidelines (ASOG) application executing on a computer system, where the structured metadata represents a plurality of ASR forms;
building a plurality of ASR form group containers by the ASOG application based on the traversing, where each ASR form group container is associated with one access service request type and the ASR form group container comprises definitions of forms, sections, and attributes and methods for accessing the forms, sections, and attributes by a front-end workstation for presenting an ASR; and
caching each of the ASR form group containers by the ASOG application in a memory of the computer system,
wherein the ASR form group containers are built once during an execution cycle by the ASOG application on initiation of the ASOG application.

2. The method of claim 1, further comprising:
requesting an ASR form group container from the ASOG application by a front-end application executing on a different computer system;
presenting an ASR form on a display of the different computer system by the front-end application;
capturing by the front-end application data that has been input to the ASR form;
formatting the input data; and
transmitting the formatted data to a third party, whereby an access service request is completed.

3. The method of claim 1, wherein the ASR forms represented by the structured metadata comprise a transport service request form, a cancel service request form, and an end user special access order request form.

4. The method of claim 1, further comprising:
editing a spreadsheet that represents ASOG ASR form definitions; and
executing a script on a computer system to generate the structured metadata and write it to the data store, wherein the script processes the spreadsheet as input.

5. The method of claim 1, further comprising:
changing the structured metadata in the data store;
terminating the ASOG application;
restarting the ASOG application;
traversing the changed structured metadata read from a data store by the ASOG application after restarting;
building a plurality of new ASR form group containers by the ASOG application based on the traversing the changed structured metadata; and
caching each of the new ASR form group containers by the ASOG application in the memory of the computer system,
whereby the ASR form group containers are revised in response to changed ASOG ASR form definitions.

6. The method of claim 1, wherein the structured metadata is contained in a plurality of tables.

7. The method of claim 6, wherein the tables comprise an ASR type table, a form table, a form content table, a form section table, a section content table, and an attribute table.

8. A computer system for providing access service request (ASR) forms, comprising:
a data store comprising structured metadata, where the structured metadata represents a plurality of ASR forms;
a processor;
a non-transitory memory; and
an access service ordering guidelines (ASOG) application stored in the non-transitory memory that, when executed by the processor,
traverses the structured metadata read from the data store,
builds a plurality of ASR form group containers by the ASOG application based on the traversing, where each ASR form group container is associated with one access service request type and the ASR form group container comprises definitions of forms, sections, and attributes and methods for accessing the forms, sections, and attributes by a front-end workstation for presenting a ASR, and
caches each of the ASR form group containers by the ASOG application in a memory of the computer system, wherein the ASR form group containers are built once during an execution cycle by the ASOG application on initiation of the ASOG application.

9. The computer system of claim 8, further comprising a transitory memory, wherein the ASOG application caches each of the ASR form group containers in the transitory memory.

10. The computer system of claim 8, wherein the ASOG application caches each of the ASR form group containers in the non-transitory memory.

11. The computer system of claim 8, wherein the ASR forms represented by the structured metadata comprise transport service request form, a cancel service request form, and an end user special access order request form.

12. The computer system of claim 8, wherein the structured metadata is contained in a plurality of tables.

13. The computer system of claim 12, wherein the tables comprise an ASR type table, a form table, a form content table, a form section table, a section content table, and an attribute table.

14. The computer system of claim 8, wherein the attribute table comprises rows having an attribute minimum length column, an attribute maximum length column, and an attribute mask value column.

15. A method of presenting standardized forms, comprising:
   traversing structured metadata read from a data store by a form application executing on a computer system, where the structured metadata represents a plurality of standardized forms;
   building a plurality of form group containers by the form application based on the traversing, where each form group container is associated with one user interface presentation and the form group container comprises definitions of forms, sections, and attributes and methods for accessing the forms, sections, and attributes by a front-end workstation for presenting the user interface; and
   caching each of the form group containers by the form application in a memory of the computer system.

16. The method of claim 15, wherein the application caches each of the form group containers in a transitory portion of the memory.

17. The method of claim 15, wherein the structured metadata is contained in a plurality of tables.

18. The method of claim 15, wherein the structured metadata represents a plurality of ASR forms.

19. The method of claim 18, wherein the ASR forms represented by the structured metadata comprise a transport service request form, a cancel service request form, and an end user special access order request form.

20. The method of claim 15, further comprising:
   requesting a form group container from the application by a front-end application executing on a different computer system;
   presenting a form on a display of the different computer system by the front-end application;
   capturing by the front-end application data that has been input to the form;
   formatting the input data; and
   transmitting the formatted data to a third party, whereby a request is completed.

* * * * *